United States Patent [19]

Wu

[11] Patent Number: 5,138,534

[45] Date of Patent: Aug. 11, 1992

[54] SOLAR POWER OPERATED, VEHICLE NIGHT ILLUMINATOR CIRCUIT

[76] Inventor: Chun-Liang Wu, 4F., No. 113, Sec. 1, Chung Chen Rd., Taipei, Taiwan

[21] Appl. No.: 820,264

[22] Filed: Jan. 14, 1992

[51] Int. Cl.$^5$ .............................................. B62J 6/00
[52] U.S. Cl. ...................... 362/72; 362/183; 362/802; 315/77
[58] Field of Search ............... 362/61, 72, 183, 802; 315/77, 149, 150, 159

[56] References Cited

U.S. PATENT DOCUMENTS

| | | | |
|---|---|---|---|
| 4,325,108 | 4/1982 | Spingler | 362/72 |
| 4,384,317 | 5/1983 | Stackpole | 362/183 |
| 4,486,820 | 12/1984 | Baha et al. | 362/183 |
| 4,974,129 | 11/1990 | Grieb et al. | 362/183 |

Primary Examiner—Ira S. Lazarus
Assistant Examiner—Sue Hagarman
Attorney, Agent, or Firm—Varndell Legal Group

[57] ABSTRACT

A solar power operated, vehicle night illuminator circuit, comprised of a charging circuit, a forced oscillation prohibition circuit, a control circuit, and a light emitting diode circuit consisted of an oscillatory circuit, a resonance circuit and a booster circuit, said charging circuit comprised of a solar collector to collect and convert the radiant energy of sunlight into electric power for charging a battery via a diode, said forced oscillation prohibition circuit being to electrically disconnect said light emitting diode circuit from said charging circuit upon the operation of said solar collector, said control circuit being to connect said battery to said light emitting diode circuit causing a light emitting diode to emit light when said solar collector receives no radiant energy of sunlight.

1 Claim, 1 Drawing Sheet

5,138,534

SOLAR POWER OPERATED, VEHICLE NIGHT ILLUMINATOR CIRCUIT

BACKGROUND AND SUMMARY OF THE INVENTION

The present invention relates to a solar power operated, vehicle night illuminator circuit which comprises a charging circuit to convert the radiant energy of sunlight into electric power of charging a battery, and a control circuit to drive a light emitting diode circuit causing it to automatically turn on a light emitting diode during the night or in the dark.

Riding a bicycle without illuminator in the dark is dangerous. However, it is not inexpensive to equip a bicycle with a battery-operated illuminator. If a bicycle is equipped with a battery-operated illuminator, the illuminator can not emit light automatically when it is getting dark or be turned off automatically when the sun is shining bright. The present invention has been accomplished under the aforesaid circumstances in view. It is therefore the main object of the present invention to provide a solar power operated, vehicle night illuminator circuit which turns on a light emitting diode for illumination when it is getting dark or turns off the light emitting diode automatically when the sun is shining bright.

DETAILED DESCRIPTION OF THE PREFERRED EMBODIMENT

Figure 1:
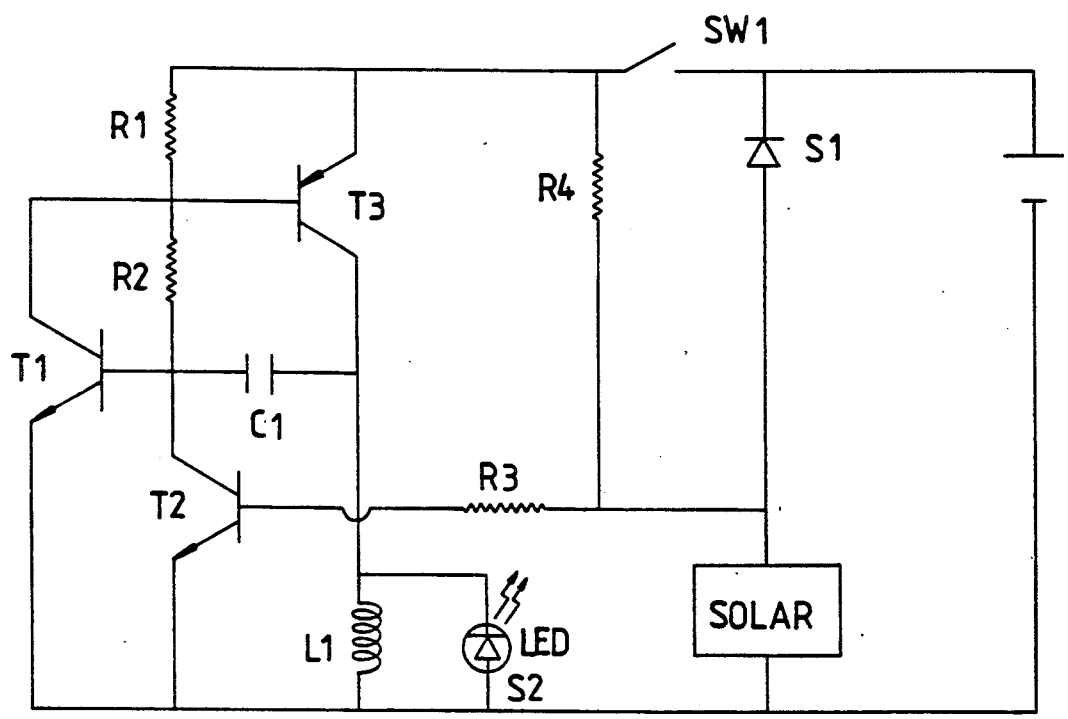
FIG. 1 is the circuit of the present invention.

Referring to FIG. 1, a solar power operated, vehicle night illuminator circuit is generally comprised of a charging circuit, a forced oscillation prohibition circuit, a control circuit, an oscillatory circuit, a resonance circuit and a booster circuit. The oscillatory circuit, the resonance circuit and the booster circuit form into an light emitting diode circuit. The charging circuit comprises a solar collector to collect and convert the radiant energy of sunlight into electric power for charging a battery via a diode S1. The forced oscillation prohibition circuit is connected between the charging circuit and the light emitting diode circuit and comprised of a resistor R3 and a transistor T2. The oscillatory circuit is connected between the forced oscillation prohibition circuit and the light emitting diode circuit and comprised of a transistor T1 and two resistors R1, R2. The voltage from the solar collector is transmitted to the transistor T2 via the resistor R3 causing the base of the transistor T1 to be turned to low potential. When the transistor T1 is turned to low potential, the light emitting diode of the light emitting diode circuit is turned off, that is, the light emitting diode of the light emitting diode circuit is turned off when the solar collector is operating. The control circuit is connected between the charging circuit and the forced oscillation prohibition circuit and comprised of a resistor R4. When the solar collector of the charging circuit is to cause the solar collector to operate), the internal impedance of the solar collector decreases the resisitor R4 of the control circuit charges the transistor T2 causing the oscillatory circuit of the light emitting diode circuit to operate and therefore, the light emitting diode of the light emitting diode circuit is turned on the emit light. When an electric voltage is sent through the resistor R1, R2 to electrically connect the transistor T1, the voltage from the resistor R1 is transmitted through the collector of the transistor T1 to its emitter. Once the T1 is electrically connected, the resistors R1, R2 are turned to low potential causing the transistor T1 to be electrically disconnected. Once the transistor T1 is electrically disconnected, the voltage is sent continuously through the resistors R1, R2 to turn on the transistor T1 again. Therefore, the transistor T1 is caused to oscillate. When the emitter of the transistor T1 is electrically connected by its collector, the resistor R1 becomes low causing the transistor T3 to be electrically connected. Therefore, the positive voltage is transmitted from the emitter of the transistor T3 to its collector causing an electric inductor L1 of the booster circuit to be turned to zero potential permitting the positive voltage to be transmitted from the collector of the transistor T3 to a capacitor C1 and the negative voltage to be transmitted to the electric inductor L1, and therefore, the transistor T1 is electrically disconnected. Once the transistor T1 is electrically disconnected, the resistor R1 becomes high causing the transistor T3 to be electrically disconnected. Once the transistor T3 is electrically disconnected, the collector of the transistor T3 is induced by the electric inductor L1 to form a negative voltage causing the capacitor C1 to produce a positive voltage at its opposite end, and therefore, the transistor T1 is electrically connected to produce an oscillation signal. When the electric inductor L1 is intermittently connected, the light emitting diode is triggered to emit light.

I claim:

1. A solar power operated, vehicle night illuminator circuit, comprised of a charging circuit, a forced oscillation prohibition circuit, a control circuit, and a light emitting diode circuit consisted of an oscillatory circuit, a resonance circuit and a booster circuit, said charging circuit comprising a solar collector to collect and convert the radiant energy of sunlight into electric power for charging a battery via a diode, said forced oscillation prohibition circuit being connected between the charging circuit and the light emitting diode circuit and comprised of a resistor R3 and a transistor T2, said oscillatory circuit being connected between said forced oscillation prohibition circuit and the said light emitting diode circuit and comprised of a transistor T1 and two resistors R1, R2, voltage from said solar collector being transmitted to the transistor T2 via the resistor R3 causing a base of the transistor T1 to be turned to low potential for turning off a light emitting diode of said light emitting diode circuit, said control circuit being connected between said charging circuit and said forced oscillation prohibition circuit and comprised of a resistor R4, the resistor R4 being to charge the transistor T2 when said solar collector is not in operation causing said light emitting diode to emit light by means of the operation of said oscillatory circuit of said light emitting diode circuit, the resistors R1, R2 being to electrically connect the transistor T1 by means of the operation of said control circuit, the resistors R1, R2 being turned to low potential immediately after the connection of the transistor T1 causing it to be electrically disconnected, upon the disconnection of the transistor T1 from said charging circuit, the voltage from said battery being sent through the resistors R1, R2 for turning on the transistor T1 again causing it to oscillate, said resonance circuit comprising a transistor T3 being electrically connected upon the connection of the transistor T1, permitting the positive voltage to be transmitted from an emitter of the transistor T3 to its collector causing an electric inductor L1 of said booster circuit to be turned to zero potential, the positive voltage being transmitted from the collector of the transistor T3 to a capacitor C1 and the negative voltage being transmitted to said electric inductor when said electric inductor L1 of said booster circuit is turned to zero potential, causing the transistor T1 of said oscillatory circuit to be electrically connected, the resistor R1 being turned to high causing the transistor T3 to be electrically disconnected upon the connection of the transistor T1, the collector of the transistor T3 being induced to produce a positive voltage upon the disconnection of the transistor T3 causing the transistor T1 to oscillate, said light emitting diode of said light emitting diode circuit being triggered to emit light upon the intermittent connection of said electric inductor L1.

* * * * *